United States Patent
Anderson et al.

(10) Patent No.: US 10,692,023 B2
(45) Date of Patent: Jun. 23, 2020

(54) PERSONAL TRAVEL ASSISTANCE SYSTEM AND METHOD FOR TRAVELING THROUGH A TRANSPORT HUB

(71) Applicant: INTERNATIONAL BUSINESS MACHINES CORPORATION, Armonk, NY (US)

(72) Inventors: Evelyn R. Anderson, Houston, TX (US); Michael Bender, Rye Brook, NY (US); Rhonda L. Childress, Austin, TX (US); Ea-Ee Jan, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 15/593,911

(22) Filed: May 12, 2017

(65) Prior Publication Data
US 2018/0330294 A1 Nov. 15, 2018

(51) Int. Cl.
| | | |
|---|---|---|
| *G06Q 50/30* | (2012.01) | |
| *G01C 21/34* | (2006.01) | |
| *H04W 4/33* | (2018.01) | |
| *G06Q 10/06* | (2012.01) | |

(52) U.S. Cl.
CPC ....... *G06Q 10/06311* (2013.01); *G01C 21/34* (2013.01); *G01C 21/3415* (2013.01); *G06Q 50/30* (2013.01); *H04W 4/33* (2018.02)

(58) Field of Classification Search
CPC .. G01C 21/206; G01C 21/3438; G01C 21/34; G01C 21/3415; H04W 4/024; H04W 4/33; H04W 4/025; H04W 4/027; H04W 64/00
See application file for complete search history.

(56) References Cited

U.S. PATENT DOCUMENTS

| | | | |
|---|---|---|---|
| 6,424,910 B1 * | 7/2002 | Ohler | G01C 21/3438 340/988 |
| 6,510,379 B1 | 1/2003 | Hasegawa et al. | |
| 6,633,232 B2 * | 10/2003 | Trajkovic | G06Q 30/06 340/573.1 |
| 6,697,731 B2 * | 2/2004 | Takayama | G01C 21/34 340/995.1 |
| 6,759,972 B2 * | 7/2004 | Gupta | G08B 27/008 340/3.52 |
| 6,837,827 B1 | 1/2005 | Lee et al. | |
| 7,136,747 B2 * | 11/2006 | Raney | G01C 21/20 701/465 |

(Continued)

OTHER PUBLICATIONS

TripIt and TripIt Pro—On the Web and the iPhone, Apr. 23, 2013 (Year: 2013).*

(Continued)

*Primary Examiner* — Scott L Jarrett
(74) *Attorney, Agent, or Firm* — Schmeiser, Olsen & Watts, LLP; Mark Vallone (57) ABSTRACT

The present invention is a method and system to assist a person traveling through a transport hub from a current location to a destination location with a smart portable computing device which provides personal data, travel data and transport hub data. The method maps a route according to personal preferences for the person to travel through the transport hub. Continuous monitoring of values provides an alert when the personal data, travel data, transport hub data, or predetermined parameters change.

20 Claims, 6 Drawing Sheets

(56) References Cited

U.S. PATENT DOCUMENTS

| | | | |
|---|---|---|---|
| 7,496,445 B2* | 2/2009 | Mohsini | G01C 21/20 340/944 |
| 7,617,044 B2* | 11/2009 | Lee | G01C 21/32 701/25 |
| 7,707,256 B2* | 4/2010 | Rollin | G06Q 10/02 235/377 |
| 7,917,866 B1* | 3/2011 | Karam | G01C 21/20 455/567 |
| 7,920,968 B2* | 4/2011 | Chapin | G01C 21/3602 340/988 |
| 7,924,149 B2* | 4/2011 | Mendelson | G01C 21/206 340/539.11 |
| 7,970,666 B1* | 6/2011 | Handel | G06Q 10/06 705/28 |
| 8,155,669 B2* | 4/2012 | Ziskind | G01C 21/30 455/456.3 |
| 8,165,799 B2* | 4/2012 | Snavely | G06Q 10/02 701/400 |
| 8,185,418 B2* | 5/2012 | de Marcken | G06Q 10/02 705/6 |
| 8,284,748 B2* | 10/2012 | Borghei | H04W 4/021 370/338 |
| 8,306,835 B2 | 11/2012 | De Marcken et al. | |
| 8,320,939 B1* | 11/2012 | Vincent | G01S 19/48 455/456.1 |
| 8,340,904 B2* | 12/2012 | Lin | G08G 1/123 340/994 |
| 8,392,113 B2* | 3/2013 | Gupta | G01C 21/206 701/400 |
| 8,412,183 B1* | 4/2013 | Kadous | G01C 21/206 455/423 |
| 8,498,810 B2 | 7/2013 | Mayer et al. | |
| 8,531,483 B1* | 9/2013 | Schileru | G06F 3/04815 345/629 |
| 8,577,589 B2* | 11/2013 | Shin | G01C 21/3415 455/456.3 |
| 8,725,612 B2* | 5/2014 | Mundinger | G06Q 10/047 705/35 |
| 8,798,643 B1* | 8/2014 | Boyle | H04W 4/023 455/456.1 |
| 8,818,706 B1* | 8/2014 | Ogale | G01C 21/206 340/539.1 |
| 8,849,560 B2* | 9/2014 | Stefani | G06Q 30/0281 701/400 |
| 8,896,485 B2* | 11/2014 | Mendelson | G01C 21/206 342/463 |
| 8,958,818 B2* | 2/2015 | Rose | H04W 4/024 455/456.1 |
| 9,026,367 B2* | 5/2015 | Paek | G01C 21/3438 701/533 |
| 9,146,115 B2* | 9/2015 | Geffner | H04W 4/02 |
| 9,182,240 B2* | 11/2015 | Poornachandran | G01C 21/16 |
| 9,191,352 B2* | 11/2015 | Parmar | H04W 4/21 |
| 9,204,251 B1* | 12/2015 | Mendelson | G08G 1/14 |
| 9,228,846 B2* | 1/2016 | DeLuca | G01C 21/343 |
| 9,232,350 B2* | 1/2016 | Foy | H04W 4/08 |
| 9,253,227 B2* | 2/2016 | Jackson | H04L 67/18 |
| 9,264,849 B1* | 2/2016 | Kahn | G06Q 10/1095 |
| 9,491,574 B2* | 11/2016 | O'Sullivan | H04W 64/006 |
| 9,513,127 B2* | 12/2016 | Goldman | G01C 21/206 |
| 9,523,583 B2* | 12/2016 | Mays | G01C 21/206 |
| 9,546,870 B2* | 1/2017 | Baca | H04W 4/02 |
| 9,552,560 B1* | 1/2017 | Tomkins | G06Q 50/01 |
| 9,571,988 B2* | 2/2017 | Taniguchi | H04W 4/21 |
| 9,615,204 B1* | 4/2017 | Haney | H04W 4/21 |
| 9,769,605 B2* | 9/2017 | Shan | H04W 4/21 |
| 9,846,041 B2* | 12/2017 | Silverstein | H04W 4/029 |
| 9,921,072 B2* | 3/2018 | Spears | G01C 21/3484 |
| 9,945,678 B2* | 4/2018 | Carter | G01C 21/3492 |
| 9,958,281 B2* | 5/2018 | Park | G08G 1/123 |
| 10,012,505 B2* | 7/2018 | Dayal | G01C 21/00 |
| 10,018,479 B2* | 7/2018 | Shastry | G06Q 50/30 |
| 10,038,977 B2* | 7/2018 | Rentz | H04W 4/023 |
| 10,074,130 B2* | 9/2018 | Hanson | G06Q 40/06 |
| 10,078,337 B1* | 9/2018 | Yao | G05D 1/0276 |
| 10,129,698 B2* | 11/2018 | Gillen | H04W 4/40 |
| 10,386,197 B2* | 8/2019 | Salowitz | G06Q 50/10 |
| 10,539,424 B2* | 1/2020 | Roy | H04W 4/20 |
| 2004/0039579 A1* | 2/2004 | Chithambaram | G06Q 10/109 705/319 |
| 2006/0155591 A1* | 7/2006 | Altaf | G06Q 10/02 705/5 |
| 2006/0206363 A1* | 9/2006 | Gove | G06Q 10/02 705/6 |
| 2006/0227047 A1* | 10/2006 | Rosenberg | G01S 5/0054 342/357.55 |
| 2006/0271277 A1* | 11/2006 | Hu | G01C 21/343 701/533 |
| 2007/0273514 A1 | 11/2007 | Winand et al. | |
| 2008/0077309 A1* | 3/2008 | Cobbold | G06Q 10/10 701/117 |
| 2008/0231507 A1* | 9/2008 | Burckart | G01C 21/20 342/357.52 |
| 2008/0312819 A1 | 12/2008 | Banerjee | |
| 2009/0008439 A1* | 1/2009 | Kubler | G01S 5/0054 235/375 |
| 2009/0100037 A1* | 4/2009 | Scheibe | G06F 17/3087 |
| 2009/0112461 A1 | 4/2009 | Murphy | |
| 2009/0177437 A1* | 7/2009 | Roumeliotis | G01C 21/12 702/150 |
| 2009/0210262 A1* | 8/2009 | Rines | G06Q 10/02 705/5 |
| 2009/0319616 A1* | 12/2009 | Lewis, II | H04W 4/12 709/206 |
| 2010/0004854 A1* | 1/2010 | Shin | G01C 21/3415 701/533 |
| 2010/0211425 A1* | 8/2010 | Govindarajan | G01C 21/34 705/7.16 |
| 2010/0268450 A1* | 10/2010 | Evanitsky | G01C 21/3423 701/533 |
| 2011/0028132 A1* | 2/2011 | Bos | H04M 3/42348 455/414.2 |
| 2011/0082638 A1* | 4/2011 | Khorashadi | G01C 21/20 701/532 |
| 2011/0106445 A1* | 5/2011 | Mayer | G06Q 10/047 701/533 |
| 2011/0113148 A1* | 5/2011 | Salmela | G01C 21/3438 709/229 |
| 2011/0191019 A1* | 8/2011 | Holsinger | G01C 21/00 701/533 |
| 2011/0284627 A1 | 11/2011 | Stefani | |
| 2012/0129546 A1* | 5/2012 | Yang | G01S 5/0252 455/456.1 |
| 2012/0143495 A1* | 6/2012 | Dantu | G01C 21/206 701/428 |
| 2012/0202428 A1* | 8/2012 | Mirbaha | H04L 12/185 455/41.2 |
| 2012/0214515 A1* | 8/2012 | Davis | H04W 4/023 455/456.3 |
| 2013/0166193 A1* | 6/2013 | Goldman | G01C 21/206 701/410 |
| 2013/0231861 A1 | 9/2013 | Yokoyama et al. | |
| 2013/0257657 A1* | 10/2013 | Garin | G01C 21/206 342/451 |
| 2013/0332273 A1* | 12/2013 | Gu | G06Q 30/0205 705/14.53 |
| 2014/0078150 A1* | 3/2014 | Li | G06T 11/60 345/440 |
| 2014/0192056 A1* | 7/2014 | Bailiang | G06T 11/206 345/440 |
| 2014/0207373 A1* | 7/2014 | Lerenc | G01C 21/3438 701/465 |
| 2014/0236475 A1* | 8/2014 | Venkatraman | G01C 21/206 701/420 |

(56) References Cited

U.S. PATENT DOCUMENTS

| | | | | |
|---|---|---|---|---|
| 2014/0336931 | A1* | 11/2014 | Wilkins | G01C 21/20 701/527 |
| 2015/0094094 | A1* | 4/2015 | Rochberger | H04W 4/043 455/456.3 |
| 2015/0153180 | A1* | 6/2015 | Ettinger | G01C 21/206 701/410 |
| 2015/0161715 | A1* | 6/2015 | Rose | G06Q 30/0639 705/26.8 |
| 2015/0187232 | A1* | 7/2015 | Bailiang | G09B 29/007 701/532 |
| 2015/0330797 | A1 | 11/2015 | Shukla | |
| 2016/0084664 | A1* | 3/2016 | Margalit | G01C 21/3438 701/410 |
| 2016/0203422 | A1 | 7/2016 | Demarchi et al. | |
| 2016/0330149 | A1* | 11/2016 | Surapaneni | H04L 51/046 |
| 2017/0108339 | A1* | 4/2017 | Silverstein | H04W 4/029 |
| 2017/0230795 | A1* | 8/2017 | Rentz | H04W 4/023 |
| 2017/0238129 | A1* | 8/2017 | Maier | H04W 4/02 455/404.2 |
| 2017/0280304 | A1* | 9/2017 | Okada | H04W 76/14 |
| 2017/0336212 | A1* | 11/2017 | Zhao | H04W 4/04 |
| 2017/0339523 | A1* | 11/2017 | Hamahata | H04W 4/027 |
| 2017/0347244 | A1* | 11/2017 | Zhang | H04W 4/04 |
| 2017/0351987 | A1 | 12/2017 | Liu | |
| 2018/0017409 | A1* | 1/2018 | Shastry | G01C 21/3682 |
| 2018/0027381 | A1* | 1/2018 | Kamino | H04L 51/20 455/456.1 |
| 2018/0180425 | A1* | 6/2018 | Hennessy | G01C 21/3438 |
| 2018/0218463 | A1* | 8/2018 | Jobling | G06Q 50/10 |

OTHER PUBLICATIONS

Eaton, Kit, Find Your Way Through the Airport Maze, Phone in Hand The New York Times, Jul. 18, 2012 (Year: 2012).*
Stellin, Susan, Yes! Download that Airline App The New York Times, Feb. 29, 2012 (Year: 2012).*
Liu, Lanjing and Siyka Zlatanova. "A "Door-To-Door" Pathfinding Approach for Indoor Navigation." 2011 (Year: 2011).*
Yang, Liping et al., Generation of navigation graphs for indoor space International Journal of Geographical Information Science, 2015 (Year: 2015).*
Le, Manh Hung V. et al., Indoor Navigation System for Handheld Devices Worcester Polytechnic Institute, Oct. 22, 2009 (Year: 2009).*
Nikoohemat, Shayan, Smart Campus Map Technical University of Munich, Nov. 2013 (Year: 2013).*
Budnik, Ruslan, Hardware free indoor Navigation for Smartphones Spirit Navigation, 2015 (Year: 2015).*
Bachmejer, Alexsander, Wi-Fi based indoor navigation in the context of mobile services University of Uulm, 2013 (Year: 2013).*
Yuan, Wenjie et al., iNav: An Indoor Navigation Model Supporting Length Dependent Optimal Routing University Florida Gainesville, Geospatial Thinking, Mar. 31, 2010 (Year: 2010).*
Sabourin, Robert A.; List of IBM Patents or Patent Applications Treated as Related; May 12, 2017; 1 page.
U.S. Appl. No. 16/385,355, filed Apr. 16, 2019.
Brute-force search, p. 1, retrieved on Sep. 11, 2019 from the Internet: <URL: https://en.wikipedia.org/wiki/Brute-force_search.
Notice of Allowance (dated Mar. 1, 2019) for U.S. Appl. No. 15/593,774, filed May 12, 2017.

* cited by examiner

FIG. 6

PERSONAL TRAVEL ASSISTANCE SYSTEM AND METHOD FOR TRAVELING THROUGH A TRANSPORT HUB

TECHNICAL FIELD

The invention relates generally to a personal travel assistance system and method for a person traveling through a transportation hub, and in particular to a system and method for alerting a traveler when to embark on a specific route through the transport hub.

BACKGROUND

A person traveling through a transport hub has many options of routes, travel times and other parameters effecting his traversal throughout the transport hub and effecting his ability and likelihood of arriving at a destination location on time. Accordingly, there is a need for improved systems and methods to assist the person in traveling throughout the transport hub.

SUMMARY

The present invention provides a method, and associated computer system and computer program product, for assisting a person traveling through a transport hub. The method includes the steps of:

providing access, by a portable smart computing device of the person, to the person's personal data, the person's travel data and transport hub data, wherein the person's travel data to travel from the transport hub in a departure vehicle includes a boarding time, departure time, departure location, and a desired arrival time at the departure location, wherein the person's personal data includes a preferred mode of traveling through the transport hub;

mapping, by the portable smart computing device, a preferred route via the preferred mode for the person to travel through the transport hub from a current location to the departure location;

monitoring, by the portable smart computing device, values including the personal data, travel data, transport hub data and predetermined parameters; and alerting the person, by the portable smart computing device in response to the monitored values, when to begin moving towards the departure location via the preferred mode along the preferred route to arrive at the departure location at the desired arrival time.

DETAILED DESCRIPTION

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
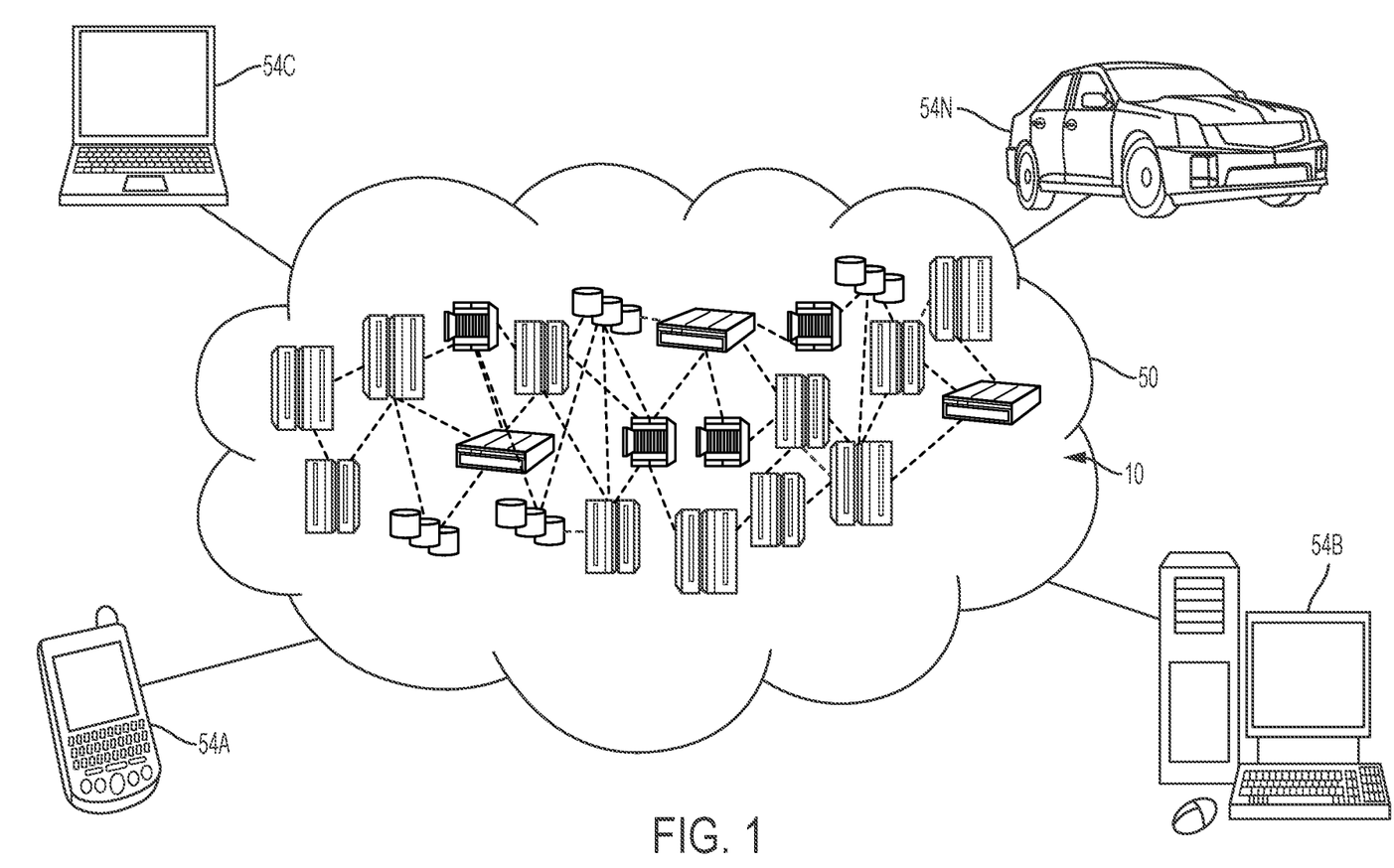
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
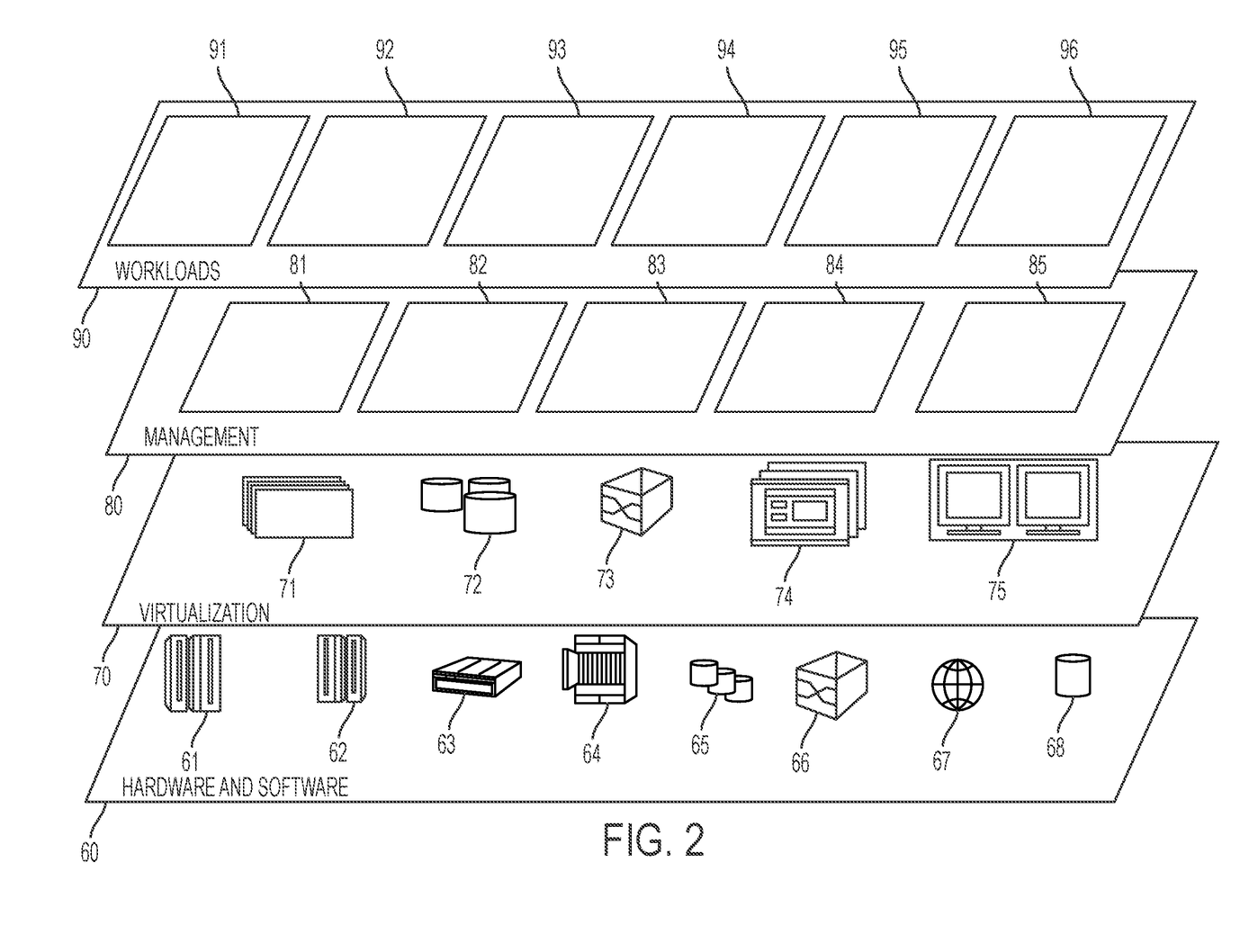
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommending travel choices to a person traveling through a transport hub 96.

A personal travel assistance system for assisting a person traveling through a transportation hub includes a software application installed on the traveler's smart phone or other smart portable communications device, which is in wireless communications with the traveler's Internet of Things IoT devices, and other network components such as computers, servers, switches, etc. which together enable the system to operate over a wireless network in a cloud computing environment. A personal IoT wireless device includes, but is not limited to, a smart watch, an activity tracker, a pedometer, a fitness tracker, a walking tracker and a personal movement sensing device. These IoT devices typically communicate with one another or with the person's smart phone with wireless communications such as bluetooth technology. A person's smart portable communications device includes, but is not limited to, devices which provide wireless communications such as a smart phone, an iPad™, a smart tablet or a laptop computer.

A person who is traveling will often encounter a transportation hub, also referred to as a transport hub or transport interchange, which is a place where passengers are exchanged between vehicles in various transport modes. Transport hubs include, but are not limited to, airports, train stations, bus stations and rapid transit stations. The personal travel assistance system will gather and analyze the person's personal data, the person's travel data and the pertinent transportation hub data in order to provide assistance to the person traveling through the transport hub.

When traveling through a transportation hub like an airport terminal, a passenger is required to arrive at a departure location or gate at or before a given boarding time in order to board the departure vehicle such as an airplane, which will be leaving the airport at an established departure time. The traveler's personal portable smart computing device, such as a smart phone with wireless Internet capability, includes software applications to assist the person in his travels. The traveler can also have access to numerous IoT devices which can communicate, for instance via Bluetooth communications, with one another and with the person's smart phone or other portable smart computing device.

Transport hub data can be downloaded or otherwise accessed by the person's portable smart computing device from a computing cloud via the Internet, whereby the transport hub data will include maps or layout information of the particular transportation hub. For instance, interactive airline information and airport terminal maps are available online which provide information about each terminal such as, but not limited to, arrival terminal maps, departure terminal maps, specific airline gate information, flight information, locations of shops, restaurants, lounges, banks, parking, transits, trams, boarding areas, restrooms, smoking areas, elevators, escalators, public phones, stairwells, defibrillators, mailboxes, water fountains, assisted care areas, etc.

Personal data for the traveler is available from the person's smart phone, or from other nearby IoT devices, or from remote storage locations/computers via the Internet and the computing cloud. The person's personal data can include items such as, but not limited to, health data, age, height, weight, and eating preferences or requirements.

The traveler's personal health data can also include medical records and prescription drug data. The health data can provide information such as:
- How far the person can walk before needing to stop to rest;
- An average speed and a maximum speed at which the person can walk;
- Whether the person can carry or pull his own luggage through the transport hub, or whether he needs to request assistance from airport or airline personnel to transport his luggage;
- How many pieces of luggage he can carry or pull, measured for instance by the number of luggage items he can maintain, or by the weight of the luggage;
- Whether the person can walk, or if he needs a wheelchair or a motorized cart to travel through the transport hub; and
- Whether the person should preferably use moving walkways, elevators and escalators.

A person's travel data includes information about his current travel plans including his flight number, departure gate or location, departure time of his flight, boarding time to board the flight, and a desired arrival time for the traveler to arrive at the departure location. His travel data can be accessed on his smart phone via the computing cloud/Internet, from other IoT devices, or it can be manually input into his phone by the traveler/user himself.

Each person can add or change individual preferences to his travel data. The updated travel data can be stored and updated in one or more memories/databases on the smart phone, the IoT devices, or in the computing cloud or network. For instance, one person may have a travel data preference to immediately go to his departure location upon arriving at the airport. Another person may have a different travel data preference to typically stop at a restroom or a restaurant prior to heading to the departure gate location. Still another person may prefer to go to a cocktail lounge to relax and have a drink.

A person's personal data includes information about his health, lifting ability, ability to carry or pull luggage, endurance, and ability to walk through the transport hub. This personal data must be taken into account as the traveler moves through the transport hub according to his personal travel preferences, such as stopping at a restaurant for food before moving to the departure gate. One person may take 15 minutes to walk at a given speed from a given location (e.g. a current location such as at a restaurant) in the transport hub to a departure gate, whereas another person may have to walk at a much slower speed due to health restrictions, and may require 25 minutes to make the same walk. Yet another person may require a motorized transport because the distance from the restaurant to the departure gate is too far for him to walk without frequent rest stops.

In one example, a traveler arrives at an airport terminal transport hub from an airplane which arrives at gate A1 (e.g. arrival location) at 11:00 am. He has a connecting flight at gate B3 (e.g. the departure location) which begins boarding at 12:30 pm and leaves at 1:00 pm. This traveler is a healthy individual with no medical constraints and he prefers to wait in the lounge area of the airport to have a drink and watch the news on one of the overhead televisions, rather than to wait in the boarding area at gate B3. The personal travel assistance system will aid the traveler by analyzing his personal data, his travel data and the transport hub data. Information will include how long he can spend at the lounge before he receives an alert on his smart phone to head towards departure gate B3. In this particular example, the traveler prefers to arrive at the departure gate 10 minutes before the boarding time, and the walk from the lounge to the departure gate is 15 minutes, or 10 minutes if he uses the moving walkways available en route.

All of the person's personal data, travel data and the transport hub data is continuously monitored and updated by his smart phone. The composite data is stored in one or more memories or databases resident on the phone, on associated IoT devices, or in the computer cloud.

The traveler's smart phone provides an alert such as a sound or visible warning to prompt the traveler to begin his journey to the departure gate in order to arrive on time. The phone can also provide early warnings, such as a notification or alert that he must leave the lounge soon (e.g. in 10 minutes) in order to arrive on time at the departure gate. The system and method can also:
- Determine the most efficient route that should be taken from the traveler's current location to the departure gate;
- Determine whether the traveler should walk, take the train, use moving walkways, etc;
- Determine if the traveler will have time to make additional stops while en route to the departure gate;
- Determine the walking pace or speed required to arrive at the departure gate on time;
- Consider the traveler's historical health and performance data, e.g. stored in a database, to make a determination as to when to leave his current location to arrive at the departure gate on time; and Adjust the travel time, travel speed, arrival time, etc. as monitored values may change.

Figure 3:
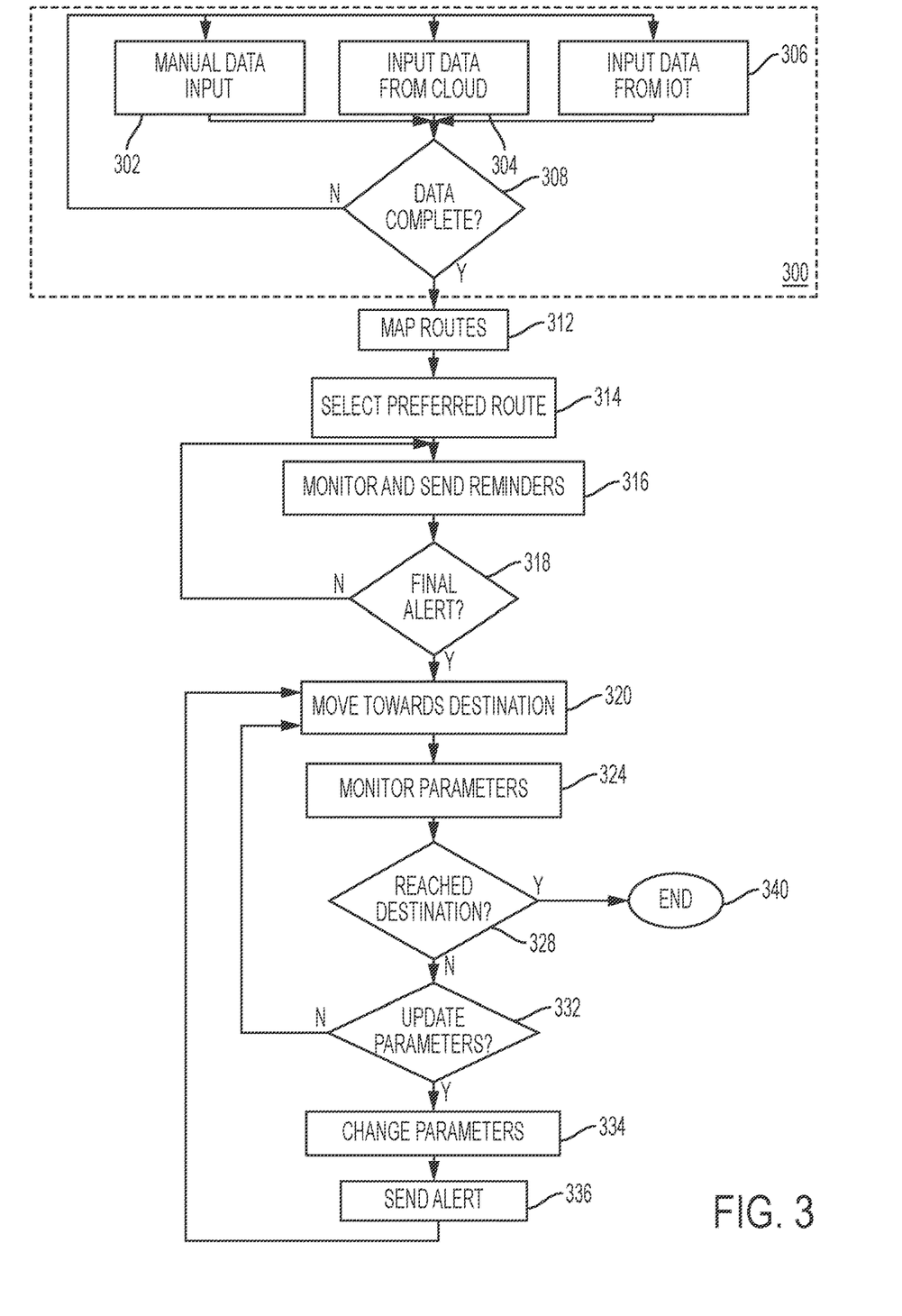
FIG. 3 is a flow chart diagram of a method in accordance with embodiments of the present invention.

FIG. 3 is a flow chart diagram of a method in accordance with embodiments of the present invention. The method is performed by a software application installed on a traveler's smart phone or other portable smart device. In this example, Ben is traveling by airplane from Boston's Logan International Airport (BOS) to Los Angeles International Airport (LAX). Input section 300 of the personal travel assistance system allows for creation or modification of Ben's individual traveler profile which includes his personal data and travel data, as well as transportation hub data pertinent to the traveler's travel plans. Data can be manually input in step 302 by the traveler, such as on his smart phone, or it can be pushed or pulled from data received from the computing cloud in step 304 or from his personal IoT device(s) in step 306.

Decision step 308 determines whether the traveler's profile is complete with respect to his current travel plans, and including other basic personal data, travel data and transportation hub data relating to his trip. If the profile information is incomplete, then the process loops back to the input steps 302, 304, 306 in an effort to input additional data. The method could also prompt the traveler to input and gather requested data. When no additional data is received in steps 302, 304, 306, then a determination is made in step 308 that the input data for the profile with regards to his current trip is complete. Once his current trip has passed, all gathered information will be stored as historical data in a database for future use. This information can be stored, for instance, on his portable computing device or on other devices accessed through the computing cloud. The historical data over time can be used to provide patterns and preferences of an individual's profile.

In one example, Ben is traveling non-stop on Jet Blue Airlines on Flight #1375 leaving Logan at 10:15 am EST and arriving at Los Angeles at 9:09 pm PST. The flight begins boarding in Boston at 9:45 am at gate B33 in Terminal B. Ben has previously set-up a profile with personal information such as his name, address, age, height and weight. Ben's travel preferences include arriving at the departure gate B33 at least 30 minutes prior to boarding. He also prefers to arrive at the airport early enough to stop for a meal prior to boarding the plane. In addition, Ben prefers to typically stop at a rest room on his way to the departure gate, and stop at a news stand to purchase reading material prior to the flight. All of this personal and travel information has been stored in the computing cloud for Ben's profile data in accordance with his previous travels.

Ben arrives at Logan airport at 7:00 am, parks, checks in his bags, goes through the security check point and arrives at a restaurant at 7:30 am. Ben could have activated the personal travel assistance system app (i.e. software application) on his smart phone as soon as he arrived at the airport, but in this particular case, he waited to start the app until after he arrived at the restaurant in terminal B where he plans to have breakfast. Ben also carries a personal pedometer smart watch which links via bluetooth wireless technology with his smart phone to measure Ben's walking speeds, distances and times.

FIG. 3, step 300 includes gathering information about Logan airport which in this case is the transportation hub. Transport hub data includes maps, terminal layouts, airline flight data, and other information available to Ben from his smart watch using the computing cloud along with global positioning system (GPS) capabilities.

When all of Ben's personal data, travel data and the transport hub data has been collected in step 300 and the data is determined to be complete in step 308, then the process continues in step 312 where various routes are established from the collected personal, travel and transport hub data. A preferred route can be automatically selected by the app in step 314 based upon all the collected information and Ben's predetermined preferences, or Ben can manually select a preferred route. For instance, perhaps on a particular trip Ben brings reading material so he doesn't need to stop at a news stand as would be his standard preferred practice. In that case, his route, as well as his travel distance and time from the restaurant or other current location to the departure gate would be altered.

As Ben eats his breakfast in the restaurant, the personal travel assistance system is continuously monitoring values including the personal data, travel data, transport hub data and predetermined parameters for him to travel through Logan Airport in order to arrive at the departure gate B33 in terminal B at least 30 minutes prior to the 9:45 am boarding time. One parameter example is the distance between the restaurant and the departure gate, which will be mapped so that he can stop at a rest room along the way, and so that he can stop at a news stand along the way according to his personal preferences. The distance parameter could be determined or estimated, for example, from online airport mapping data. Another parameter example is his travel speed which can be measured from his pedometer smart watch. Yet another parameter example is the travel time from the restaurant to departure gate B33 which can be estimated by calculating Ben's average walking travel speed in view of the estimated travel distance. Of course, Ben's personal data also includes health data which indicates what distances Ben can walk, what speed he can walk, and when he would need to stop to rest.

Another variable which can effect how quickly Ben can move throughout the transport hub to the departure gate is crowd size. This information can be obtained, for instance, by accessing historical crowd size data for Logan airport at a particular time and day of the week from the computing cloud. Also, crowd sizes can be estimated for each terminal (e.g. terminal B) based upon the number of arriving or departing flights within a time frame, and the capacity or fullness of each of the flights. Crowd sizes can also be estimated by identifying a number of smart devices within the transport hub, assuming that individuals each carry their own smart phone or other portable personal computing device.

Once the preferred route has been selected in step 314, the method loops through steps 316 and 318 to monitor the values including the personal data, travel data, transport hub data and predetermined parameters and watch for alerts. In step 316 the values are monitored while Ben is eating his breakfast at the restaurant. Ben's travel time considerations include 5 minutes for him to pay his bill at the restaurant, 10 minutes to walk to the closest rest room, a 5 minute duration time at the rest room stop, another 10 minutes to an en route news stand, a 5 minute duration time for purchasing reading material at the news stand, and another 4 minute walk time from the news stand to the departure gate B33 for a total travel time of 39 minutes from the restaurant to the departure location. Hence, Ben should receive an alert at 9:06 am in order to arrive at departure gate B33 by 9:45 am.

Step 316 monitors the current time, Ben's current location and movements. In this example, Ben has set up a reminder notification on his smart phone to alert him 10 minutes before it is necessary for him to leave the restaurant for his departure gate location. He can select to have the phone send an alert by vibrating, displaying a visual signal or message, sounding an audio alert or any combination thereof. The method has determined as noted above that Ben should allow 39 minutes from the time he leaves the restaurant to arrive at the departure location 30 minutes prior to the initial boarding time. Prior to 9:06 am the method will continue to loop through steps 316, 318 and monitor the values including the personal data, travel data, transport hub data and predetermined parameters for change. At 9:06 am step 318 will issue a final alert to Ben.

Upon receiving the final alert in step 318, Ben pays his restaurant bill and in step 320 begins moving towards his destination. The values continue to be monitored in step 324. Step 328 determines whether he has reached the departure gate. If so, then the method ends in step 340. if not, then step 332 continues monitoring to determine whether any of the values have changed and need to be updated. If none of the values have changed, then no updating is needed and the process continues by looping back to step 320. However if parameter changes are detected, then the changes are updated in step 334. Whenever any values change occurs, step 336 will alert Ben of the change on his smart watch. The values will continue to be monitored until Ben reaches his final destination at departure gate B33.

Various situations can cause changes in the monitored values including the personal data, travel data, transport hub data and predetermined parameters which in turn will elicit a notification and update. For instance if the flight and boarding times have been delayed, then the time for Ben to reach the departure gate location will be delayed as well. If Ben is walking faster than usual, then the projected time at which he will reach his destination will be adjusted. In each case, Ben will be notified on his smart phone of the update.

Figure 4:
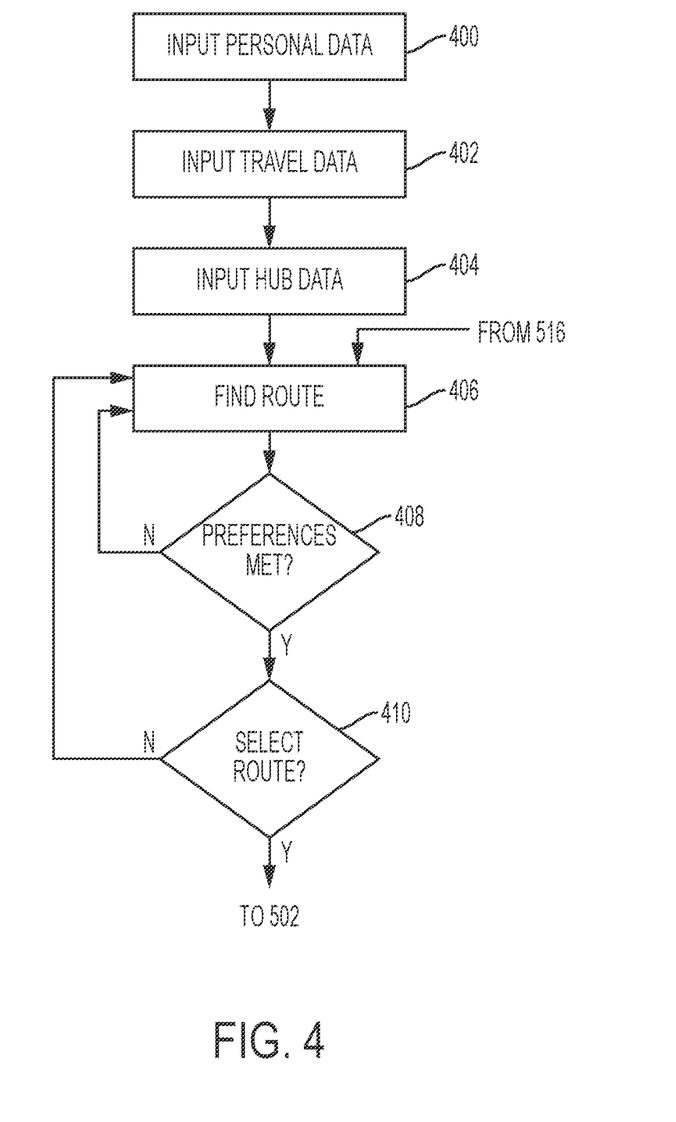
FIG. 4 is a flow chart diagram of a method for setting up a traveler profile and selecting a route to travel through a transportation hub in accordance with embodiments of the present invention.

FIG. 4 is a flow chart diagram of a method for setting up a traveler profile and selecting a route to travel through a transportation hub in accordance with embodiments of the present invention. The traveler's profile consists of personal data which is input in step 400, travel data which is input in step 402, and transportation hub data which is input in step 404. The input data includes values which are applicable for the traveler's current trip. The values also reflect the traveler's preferences, such as when to arrive at the boarding gate and which route to take when walking through the terminal, i.e. transportation hub.

The method is implemented as a software application installed on the traveler's personal computing device, for instance his smart phone which in turn communicates with the traveler's IoT devices via bluetooth and communicates with devices such as remote servers via a computing cloud of wireless communications (e.g. the Internet). The traveler can initiate the method upon arriving at a transportation hub such as an airport, bus terminal or train station.

In step 406 the method uses the personal, travel and hub input data to find a route of travel through the transportation hub from the traveler's current location to his destination, typically to a departure location such as a boarding gate at an airport. If the traveler's preferences are not met as determined in step 408, then the input data is analyzed to find another route in step 406. When a travel route meets the traveler's preferences as determined in step 408, then the route can either be automatically selected, or it can be presented to the traveler on his smart phone for his selection. Multiple routes could be offered whereby the traveler would select one. If none of the available travel routes meets each of the traveler's preferences, then the traveler will be alerted on his smart phone so that he can either select one of the available routes, or he can modify his preferences and allow the method to search for routes once again. When a route is selected in step 410, the method continues to step 502 in FIG. 5.

Figure 5:
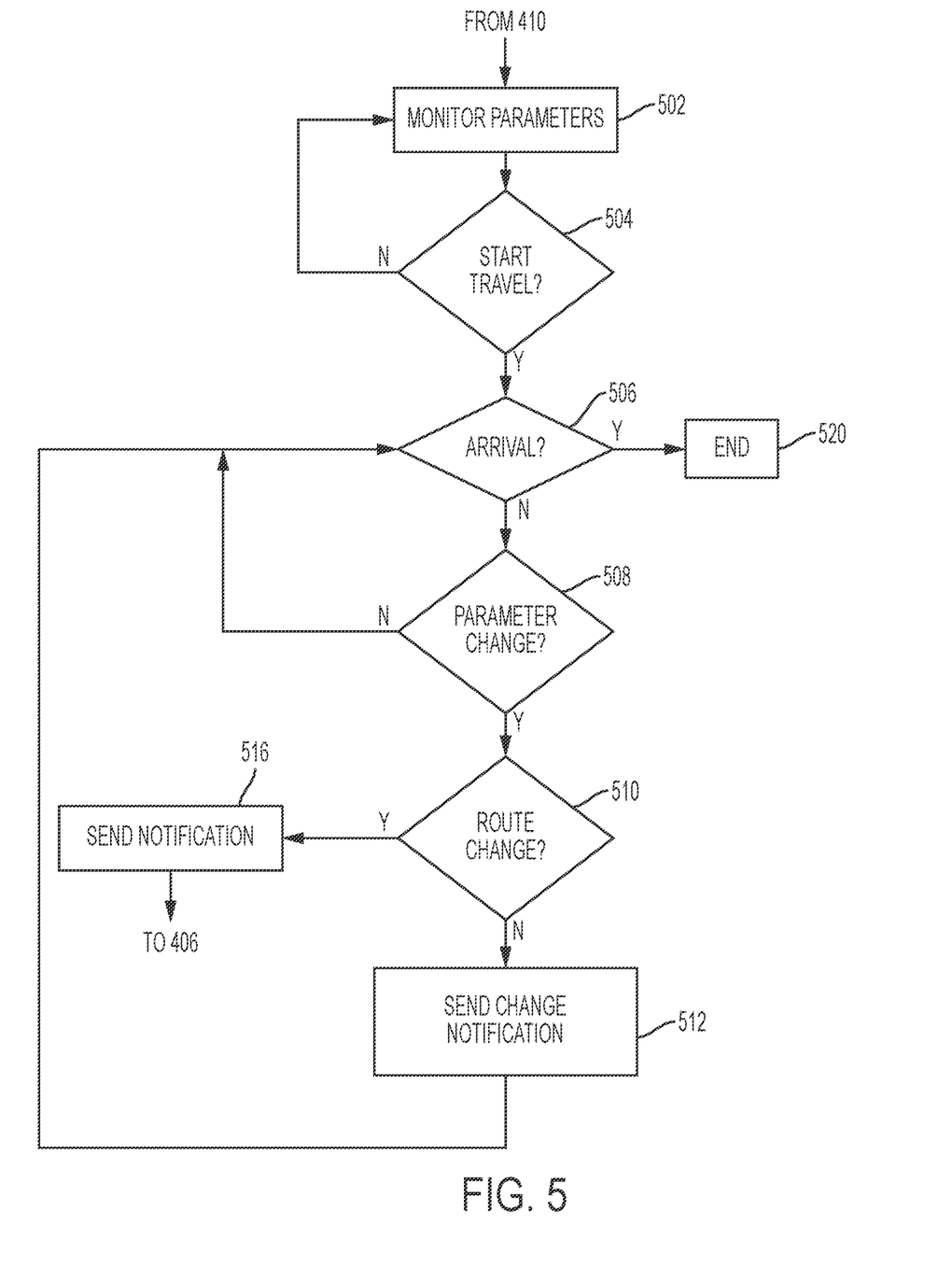
FIG. 5 is a flow chart diagram of a method for monitoring values while traveling through a transportation hub in accordance with embodiments of the present invention.

FIG. 5 is a flow chart diagram of a method for monitoring values including the personal data, travel data, transport hub data and predetermined parameters to travel through a transportation hub in accordance with embodiments of the present invention. A route has been selected and the values are being continuously monitored in step 502. The predetermined parameters include the distance to travel through the transport hub, the time required to walk or otherwise travel from the current location to the destination location, as well as factors such as carrying or rolling luggage, making stops along the way, etc. The system will alert the traveler by audio, visual or vibration on his smart phone in step 504 when it is time to start moving towards the destination location. When he arrives at the destination location as determined in step 506, then the method ends in step 520.

While the person travels through the transportation hub, the monitoring of the values will continue in step 508 to determine whether any parameter change has occurred. For instance, a boarding time may have changed. If there are no parameter changes, then the method continues to loop through steps 506, 508 to monitor whether the person has reached his destination, and to determine whether any values have changed. If a value change is detected in step 508, then the process continues in step 510 which determines whether the value change necessitates a route change. For instance, the flight may have been moved to a different departure gate/location. If a route change is deemed as necessary in step 510, then a notification or alert is sent to the traveler on his smart phone in step 516 and the process loops back to step 406 so that a new route can be determined and selected as previously described. If no route change is necessary in step 510, then a notification of the parameter change detected in step 508 is sent in step 512 to the person's smart phone and the method loops back to step 506 to monitor and determine whether the person has yet arrived at the destination location.

Figure 6:
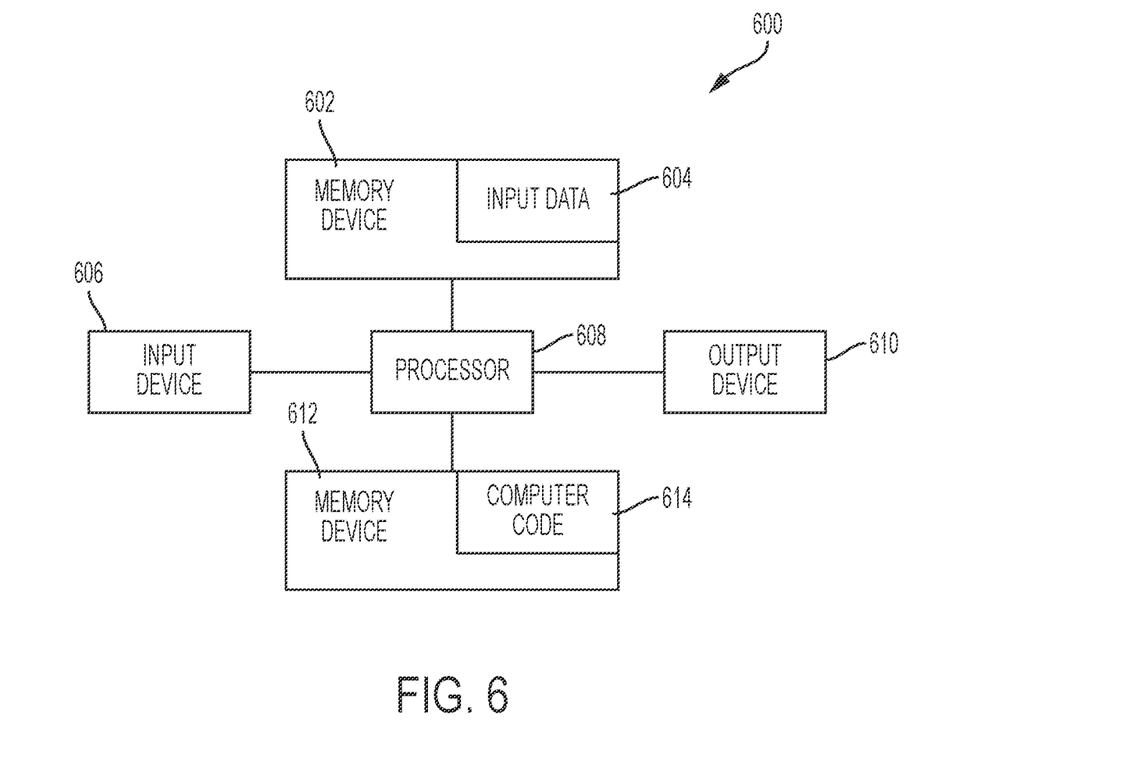
FIG. 6 illustrates an embodiment of a computer system used for implementing the methods of the present invention.

FIG. 6 is a block diagram of a computer system, aka computing device, 600 for implementing search engine optimization based upon most popular search histories in accordance with embodiments of the present invention. The computing device 600 includes a processor 608, an input device 606 coupled to the processor 608, an output device 610 coupled to the processor 608, and memory devices 602 and 612 each coupled to the processor 608. The input device 606 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions.

The computer code 614 includes software or program instructions that may implement an algorithm for implementing methods of the present invention. The processor 608 executes the computer code 614. The memory device 602 includes input data 604. The input data 604 includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614.

Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assisting a person traveling through a transport hub, the method comprising:
    collecting, by a portable smart computing device of the person, data comprising the person's personal data, the person's travel data pertaining to travel from the transport hub in a departure vehicle, and transport hub data, wherein the person's travel data includes a boarding time, a departure time, a departure location, and a desired arrival time at the departure location, wherein the person's personal data includes one or more of: the person's health, the person's lifting ability, the person's ability to pull or carry luggage, the person's endurance, and the person's ability to walk through the transport hub, wherein the transport hub data includes of maps and layout data of the transport hub;
    determining, by the portable smart computing device, that the collected data are complete;
    in response to said determining that the collected data are complete, mapping, by the portable smart computing device, a plurality of routes for the person to travel through the transport hub from a current location to the departure location, said mapping the plurality of routes comprising: (i) receiving a first input of a plurality of specified stops within the transport hub that the person prefers to stop at during the person's movement to the departure location, (ii) receiving a second input of a specified minimum number of minutes prior to boarding that the person prefers to arrive at a departure gate at the departure location,(iii) constraining each route of the plurality of routes to pass through each specified stop of the plurality of specified stops, and (iv) constraining each route of the plurality of routes to enable the person to arrive at the departure gate before or at the specified minimum number of minutes prior to boarding;
    receiving, by the portable smart computing device, a route of the plurality of routes selected by the person enabling the person to arrive at the departure gate before or at the specified number of minutes prior to boarding;
    iteratively monitoring, by the portable smart computing device, values including the personal data, the travel data, the transport hub data, and the current location, said monitoring comprising detecting, by a global positioning system (GPS) capability of the portable smart computing device, the current location;
    iteratively updating, by the portable smart computing device, the monitored values including the personal data, the travel data, the transport hub data, and the current location; and
    iteratively alerting the person, by the portable smart computing device in response to the updated monitored values, when to begin moving from the current location towards the departure location along the selected route to arrive at the departure location at the desired arrival time.

2. The method of claim 1, wherein the monitored values include predetermined parameters, and wherein the predetermined parameters comprise:
    a distance from the current location to the departure location;
    an estimated travel speed of the person to travel from the current location to the departure location; and
    an estimated travel time of the person to travel from the current location to the departure location to arrive at the departure location at the desired arrival time.

3. The method of claim 1, wherein the personal data further includes: health information regarding how far the person can walk before needing to rest; a speed the person can walk; how many pieces and how much weight of luggage the person can carry, or pull on wheels; whether the person requires assistance with his luggage; whether the person requires a wheelchair or motorized transportation; and whether the person requires assistance to travel to the departure location.

4. The method of claim 1,
    wherein the transport hub data includes: the transport hub layout; locations of departure vehicles; and locations of transporting devices within the transport hub,
    wherein said transporting devices comprise elevators, escalators, moving walkways and trams, and
    wherein the transport hub comprises an airport transport hub, a railway transport hub and a bus terminal transport hub, and wherein the departure vehicle comprises an automobile, a train, an airplane, a bus and a motorized vehicle.

5. The method of claim 1, further comprising:
    notifying the person, by the portable smart computing device, of a change of the values.

6. The method of claim 1, wherein the portable smart computing device includes wireless capabilities to access the person's personal data, the person's travel data and the transport hub data from a computer cloud or from a network.

7. The method of claim 6, wherein the portable smart computing device communicates with Internet of Thing IoT wireless devices of the person including a smart watch, an activity tracker, a fitness tracker, a walking tracker and a personal movement sensing device.

8. The method of claim 7, wherein the portable smart computing device coordinates updates in memories in the person's portable smart computing device, personal IoT devices, computer cloud and network in response to changes of the person's personal data, the person's travel data and the transport hub data.

9. A computer program product, comprising one or more computer readable hardware storage devices having computer readable program code stored therein, said program code containing instructions executable by a computing device to implement a method for assisting a person traveling through a transport hub, the method comprising:

collecting, by a portable smart computing device of the person, data comprising the person's personal data, the person's travel data pertaining to travel from the transport hub in a departure vehicle, and transport hub data, wherein the person's travel data includes a boarding time, a departure time, a departure location, and a desired arrival time at the departure location, wherein the person's personal data includes one or more of: the person's health, the person's lifting ability, the person's ability to pull or carry luggage, the person's endurance, and the person's ability to walk through the transport hub, wherein the transport hub data includes of maps and layout data of the transport hub;

determining, by the portable smart computing device, that the collected data are complete;

in response to said determining that the collected data are complete, mapping, by the portable smart computing device, a plurality of routes for the person to travel through the transport hub from a current location to the departure location, said mapping the plurality of routes comprising: (i) receiving a first input of a plurality of specified stops within the transport hub that the person prefers to stop at during the person's movement to the departure location, (ii) receiving a second input of a specified minimum number of minutes prior to boarding that the person prefers to arrive at a departure gate at the departure location,(iii) constraining each route of the plurality of routes to pass through each specified stop of the plurality of specified stops, and (iv) constraining each route of the plurality of routes to enable the person to arrive at the departure gate before or at the specified minimum number of minutes prior to boarding;

receiving, by the portable smart computing device, a route of the plurality of routes selected by the person enabling the person to arrive at the departure gate before or at the specified number of minutes prior to boarding;

iteratively monitoring, by the portable smart computing device, values including the personal data, the travel data, the transport hub data, and the current location, said monitoring comprising detecting, by a global positioning system (GPS) capability of the portable smart computing device, the current location;

iteratively updating, by the portable smart computing device, the monitored values including the personal data, the travel data, the transport hub data, and the current location; and iteratively alerting the person, by the portable smart computing device in response to the updated monitored values, when to begin moving from the current location towards the departure location along the selected route to arrive at the departure location at the desired arrival time.

10. The computer program product of claim 9, wherein the monitored values include predetermined parameters, and wherein the predetermined parameters comprise:
a distance from the current location to the departure location;
an estimated travel speed of the person to travel from the current location to the departure location; and
an estimated travel time of the person to travel from the current location to the departure location to arrive at the departure location at the desired arrival time.

11. The computer program product of claim 9, wherein the personal data further includes: health information regarding how far the person can walk before needing to rest; a speed the person can walk; how many pieces and how much weight of luggage the person can carry, or pull on wheels; whether the person requires assistance with his luggage; whether the person requires a wheelchair or motorized transportation; and whether the person requires assistance to travel to the departure location.

12. The computer program product of claim 9,
wherein the transport hub data includes the transport hub layout, locations of departure vehicles, and locations of transporting devices within the transport hub,
wherein said transporting devices comprise elevators, escalators, moving walkways and trams, and
wherein the transport hub comprises an airport transport hub, a railway transport hub and a bus terminal transport hub, and wherein the departure vehicle comprises an automobile, a train, an airplane, a bus and a motorized vehicle.

13. The computer program product of claim 9, wherein the method further comprises:
notifying the person, by the portable smart computing device, of a change of the values.

14. The computer program product of claim 9, wherein the portable smart computing device includes wireless capabilities to access the person's personal data, the person's travel data and the transport hub data from a computer cloud or from a network.

15. The computer program product of claim 9, wherein the portable smart computing device coordinates updates in memories in the person's portable smart computing device, personal IoT devices, computer cloud and network in response to changes of the person's personal data, the person's travel data and the transport hub data.

16. A system, comprising a computing device, said computing device comprising one or more processors, one or more memories, and one or more computer readable hardware storage devices, said one or more hardware storage devices containing program code executable by the one or more processors via the one or more memories to implement a method for assisting a person traveling through a transport hub, the method comprising:
collecting, by a portable smart computing device of the person, data comprising the person's personal data, the person's travel data pertaining to travel from the transport hub in a departure vehicle, and transport hub data, wherein the person's travel data includes a boarding time, a departure time, a departure location, and a desired arrival time at the departure location, wherein the person's personal data includes one or more of: the person's health, the person's lifting ability, the person's ability to pull or carry luggage, the person's endurance, and the person's ability to walk through the transport hub, wherein the transport hub data includes of maps and layout data of the transport hub;

determining, by the portable smart computing device, that the collected data are complete;

in response to said determining that the collected data are complete, mapping, by the portable smart computing device, a plurality of routes for the person to travel through the transport hub from a current location to the departure location, said mapping the plurality of routes comprising: (i) receiving a first input of a plurality of specified stops within the transport hub that the person prefers to stop at during the person's movement to the departure location, (ii) receiving a second input of a specified minimum number of minutes prior to boarding that the person prefers to arrive at a departure gate at the departure location,(iii) constraining each route of the plurality of routes to pass through each specified stop of the plurality of specified stops, and (iv) constraining each route of the plurality of routes to enable the person to arrive at the departure gate before or at the specified minimum number of minutes prior to boarding;

receiving, by the portable smart computing device, a route of the plurality of routes selected by the person enabling the person to arrive at the departure gate before or at the specified number of minutes prior to boarding;

iteratively monitoring, by the portable smart computing device, values including the personal data, the travel data, the transport hub data, and the current location, said monitoring comprising detecting, by a global positioning system (GPS) capability of the portable smart computing device, the current location;

iteratively updating, by the portable smart computing device, the monitored values including the personal data, the travel data, the transport hub data, and the current location; and iteratively alerting the person, by the portable smart computing device in response to the updated monitored values, when to begin moving from the current location towards the departure location along the selected route to arrive at the departure location at the desired arrival time.

17. The system of claim 16, wherein the monitored values include predetermined parameters, and wherein the predetermined parameters comprise:

a distance from the current location to the departure location;

an estimated travel speed of the person to travel from the current location to the departure location; and an estimated travel time of the person to travel from the current location to the departure location to arrive at the departure location at the desired arrival time.

18. The system of claim 16, wherein the method further comprises:

notifying the person, by the portable smart computing device, of a change of the values.

19. The system of claim 16, wherein the personal data further includes: health information regarding how far the person can walk before needing to rest; a speed the person can walk; how many pieces and how much weight of luggage the person can carry, or pull on wheels; whether the person requires assistance with his luggage; whether the person requires a wheelchair or motorized transportation; and whether the person requires assistance to travel to the departure location.

20. The system of claim 16, wherein the portable smart computing device coordinates updates in memories in the person's portable smart computing device, personal IoT devices, computer cloud and network in response to changes of the person's personal data, the person's travel data and the transport hub data.

* * * * *